(12) United States Patent
Hairston

(10) Patent No.: US 10,079,986 B1
(45) Date of Patent: Sep. 18, 2018

(54) READOUT INTEGRATED CIRCUIT WITH MULTIVALUE DIGITAL COUNTERS

(71) Applicant: BAE SYSTEMS INFORMATION AND ELECTRONIC SYSTEMS INTEGRATION INC., Nashua, NH (US)

(72) Inventor: Allen W Hairston, Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/694,307

(22) Filed: Sep. 1, 2017

(51) Int. Cl.
| | | |
|---|---|---|
| *H04N 3/14* | (2006.01) | |
| *H04N 5/335* | (2011.01) | |
| *H04N 5/359* | (2011.01) | |
| *H04N 5/355* | (2011.01) | |
| *H04N 5/378* | (2011.01) | |

(52) U.S. Cl.
CPC .......... *H04N 5/359* (2013.01); *H04N 5/3559* (2013.01); *H04N 5/378* (2013.01)

(58) Field of Classification Search
CPC ...... H04N 5/359; H04N 5/378; H04N 5/3559; H03M 1/001; H03M 1/002
USPC ........ 348/294-324; 250/208.1; 257/290-292
See application file for complete search history.

(56) References Cited

U.S. PATENT DOCUMENTS

| | | | | |
|---|---|---|---|---|
| 2012/0113074 A1* | 5/2012 | Inoue | ................... | G01J 1/1626 345/207 |
| 2012/0267531 A1* | 10/2012 | Chammings | .............. | G01J 1/46 250/338.4 |

OTHER PUBLICATIONS

Kenneth I. Schultz, Michael W. Kelly, Justin J. Baker, Megan H. Blackwell, Matthew G. Brown, Curtis B. Colonero, Christopher L. David, Brian M. Tyrrell, and James R. Wey, "Digital-Pixel Focal Plane Array Technology", Lincoln Laboratory Journal, col. 20, No. 2, 2014, pp. 36-51.

* cited by examiner

*Primary Examiner* — Yogesh Aggarwal
(74) *Attorney, Agent, or Firm* — Maine Cernota & Rardin

(57) ABSTRACT

A high density, high speed ROIC uses in-pixel integration capacitors and comparators to convert each pixel charge to a train of pulse spikes which increment a capacitor to successive, discrete charge values that represent a digital, non-binary count value of an in-pixel multi-value digital counter (MVDC). The MVDC can include a plurality of stages whereby comparators limit the maximum count of each stage and increment subsequent stages. The maximum count can be a power of two for subsequent direct ADC conversion to binary. The count values and the residual integration capacitor charge can be read out by ramping the comparator reference inputs and measuring the comparator output timings, effectively forming partially in-pixel single-slope ADC's. The comparators can include temporary internal positive feedback to maintain consistency of the spike pulses to better than 10%.

20 Claims, 14 Drawing Sheets

READOUT INTEGRATED CIRCUIT WITH MULTIVALUE DIGITAL COUNTERS

FIELD OF THE DISCLOSURE

The following disclosure relates generally to readout integrated circuits, and more particularly to readout integrated circuits that implement in-pixel analog-to-digital conversion.

BACKGROUND

Digital detection of visual and infrared images is a very widely used technology, ranging from consumer-oriented camera and video apparatus to law enforcement and military applications. For virtually all of these applications there is a growing demand for higher image pixel counts, higher pixel density, increased sensitivity, improved dynamic range, and faster image processing.

In particular, many emerging thermal infrared (IR) sensing applications simultaneously demand high sensitivity, large dynamic range, large pixel count, and operation at fast data rates. Among these applications are day/night persistent surveillance, border patrol and protection, aerial search and rescue, and environmental remote sensing. Such applications typically require sensor systems capable of high-quality, large-pixel-count images. Furthermore, in many cases, the images must be processed rapidly to extract time-critical information. For example, real-time feature extraction that localizes a region of interest can be a key component of a high-resolution, wide-area imaging system. Organizations such as the US Army Night Vision and Electronic Sensors Directorate (NVESD) are also demanding even higher pixel counts and densities. These requirements are driving a demand for high-capacity image processing.

At the heart of all digital imaging systems is the Focal Planar Array ("FPA"), which is a two-dimensional array of elements upon which an image is focused, whereby each of the FPA elements or "pixels" develops an analog output "signal charge" that is proportional to the intensity of the light that is impinging on it. Traditionally, a readout integrated circuit ("ROIC") uses an integration capacitor to store the signal charge at each pixel of the FPA, and then routes the analog signals onto output taps for readout and digitization by external analog-to-digital converters ("ADC's"). However, this approach requires storing a large signal charge at each pixel site, and further requires that an adequate signal-to-noise ratio and dynamic range be maintained as the analog signals are read out and digitized. Accordingly, this traditional approach suffers from sensitivity and dynamic range limitations.

One approach for improving the sensitivity and dynamic range of an imaging system is to include "in-pixel" ADC circuits within the ROIC, whereby a separate digitizing circuit is located proximal to each pixel (or to each localized group of pixels) so that the signal charges for the pixels are digitized before being read out of the ROIC. However, conventional ADC circuits comprise large numbers of flip-flops and other digital elements, and as a result they are bulky and limit the pixel density that can be provided by this approach.

A more compact in-pixel ADC can be implemented by dedicating a small in-pixel integration capacitor, comparator, and binary digital counter to each pixel (or localized group of pixels). According to this approach, for each pixel, the associated small integration capacitor is charged by the signal charge of the pixel, while the comparator monitors the charge of the integration capacitor and issues an output pulse spike that resets the integration capacitor each time the integrated charge reaches a specified threshold value. The comparator thereby issues a train of output pulses, which are counted by the binary digital counter.

The train of pulses from the comparator terminates when the signal charge of the pixel is fully drained by the integration capacitor, or when the measurement ends, such that the number of pulses counted by the counter represents a digital measurement of the amplitude of the signal charge, with the reset threshold value of the comparator representing the least significant bit accuracy of the measurement. The total number of spikes is retained by the binary counter until it is read out by the multiplexer of the ROIC.

This in-pixel binary counter approach allows for an increased dynamic range, due to the ability to add bits to the binary counter. However, while this approach is an improvement over earlier methods in terms of dynamic range, the requirement for in-pixel binary digital counters still places a significant limit on the achievable pixel density, which can be unacceptable for some applications, such as the NVESD requirement for degraded visual environment and hostile fire detection and location systems.

What is needed, therefore, is an ROIC that provides in-pixel digitization of signal charges without requiring a conventional binary digital counter.

SUMMARY

An ROIC is disclosed that provides in-pixel digitization of signal charges without requiring a conventional digital counter, thereby providing the advantages of in-pixel digitization, including high signal-to-noise and improved dynamic range performance, while also providing high pixel density. The disclosed ROIC implements in-pixel integration capacitors and comparators as described above. However, instead of binary counters, the disclosed ROIC implements digital counters that are not binary counters, but instead implement digital logic having a digital base that is higher than base two. These non-binary, "multi-value" digital counters ("MVDC's") require significantly fewer components than binary counters, and are therefore highly compact and enable very high pixel densities in the FPA.

Specifically, the disclosed MVDC's store digital information by accumulating charge in a charge-accumulating capacitor, whereby the capacitor charge is allowed to take on only specific, well-defined values. Hence, the charge state of the capacitor represents a digitally stored value that is not binary, i.e. not "base-2," but instead has a digital base that is equal to the maximum number of charge states that are allowed by the MVDC.

It is notable that the inputs and outputs of all so-called "binary" devices are, in fact, analog voltages. Such devices are characterized as being "binary" only because they are constrained to only accept and to only produce inputs and outputs that fall within either of two discrete, well separated, and well characterized voltage ranges. In the same manner, the presently disclosed MVDC is configured to accept as inputs and to produce as outputs only voltages that fall within discrete, well characterized, and well separated voltage ranges. The disclosed MVDC is therefore a digital counter, even though its output can take on more than two values.

More specifically, each pixel of the disclosed ROIC includes an integration capacitor, reset, and comparator that translate the signal charge of the pixel into a train of output current pulse spikes, where the number of spikes in the train reflects the signal charge of the pixel. The spikes are converted by charge pump circuits, referred to herein as "charge pumps," into charge pulses which are directed to a charge accumulating capacitor included in the MVDC. The charge pumps ensure that each pulse spike results in the addition to the charge accumulating capacitor of a well-defined and consistent amount of charge. As a result, the charge level of the charge accumulating capacitor is increased in a step-wise manner, such that it can take on only discrete, well-characterized charge and voltage values that directly reflect the number of applied charge pulses. Subsequently, the charge or voltage value of the charge accumulating capacitor is read out by the multiplexer of the ROIC, and is converted by an ADC into a conventional, binary representation of the signal charge.

It is notable that the pixel density of the disclosed ROIC is enhanced both due to the simplicity of the MVDC circuit, and also by the fact that only a single output line is needed for reading out each of the MVDC's.

In embodiments, each pixel of the disclosed ROIC includes a plurality of cascaded MVDC stages, whereby each MVDC stage includes a comparator that resets the charge accumulating capacitor of that stage when it reaches its maximum charge value, and also sends a voltage spike to the next MVDC stage in the cascade. The maximum charge of each stage of the MVDC, and hence its numeric base, is thereby set by the magnitude of the charge pulses as determined by the charge pumps, and the threshold value that is provided to comparator of that stage. Cascading a plurality of MVDC stages in this manner serves to increase the dynamic range of the MVDC, without unduly increasing the number of charge values that each charge accumulating capacitor is required to store and discriminate.

In various embodiments, each of the MVDC stages has a numeric base that is a multiple of two. For example, charge accumulating capacitors in embodiments can take on a maximum of 8 values or 16 values, such that the output of a suitably calibrated octal or hexadecimal ADC can directly provide a binary representation of the MVDC count value.

In some embodiments, during readout, the accumulated voltages of the charge accumulating capacitors in each of the MVDC stages are transmitted through a multiplexer as full range voltage levels to an ADC for conversion to binary format. In other embodiments, the readout of the MVDC's is by means of a digital transition time, based on a comparator in the pixel. This time signal can be used as a version of a single-slope ADC, whereby the comparator of the single-slope ADC is in-pixel, while the ramp and timer of the single-slope ADC are external and multiplexed. This approach is referred to herein as the multiplexed pixel comparator (MPC) output method.

According to this MPC method, the stored charge value of each of the charge accumulating capacitors is read out by applying a ramped voltage to the reference input of the associated comparator or to the reference voltage of the accumulating capacitor, and measuring the time interval between initiating the ramp and receiving the reset pulse from the comparator. For example, the reset pulse can trigger a latch to store the timer output and can also reset the timer for readout of the next MVDC stage. In some of these embodiments, the time interval is measured by a time base and grey code digital counter. The same approach can be used to measure the residual charge of the integration capacitor, thereby improving the accuracy with which the signal charge is measured.

The MPC output single-slope ADC approach is preferable in some embodiments because it minimizes the ranges of the voltage fluctuations that must be transmitted across the multiplexer by the ROIC, and thereby minimizes power consumption and increases readout speed. For example, embodiments that use a conventional ADC to read out the MVDC charge levels can require readout of a voltage that can range up to the maximum charge level of the MVDC.

In contrast, embodiments that implement the MPC readout approach are only required to transmit a digital signal across the multiplexer, which can be a reduced voltage. Since there is always a finite capacitance associated with the readout line, these lower voltages translate into faster timing as well as lower power consumption. Accordingly, embodiments that implement the MPC single slope ADC readout approach can significantly reduce power consumption as compared to embodiments that multiplex the full analog voltage range signal.

The ability of the disclosed MVDC to store digital information requires that the spikes provided by the comparators as inputs to the charge pump circuits be full swing pulses, going completely from one voltage rail to the other. However, the comparator output spikes also function to reset the signal charge counter or the previous stage of the MVDC that provides input to the comparator. As a result, the spikes essentially reset themselves, which could pose a danger that they might limit their own amplitudes. In embodiments, the comparators include temporary internal positive feedback that guarantees the output will be driven to its maximum level. In some of these embodiments, each of the comparators has two outputs to provide the necessary timing for the reset and charge pump circuits, which require separate reset and transfer pulses, where the reset must be offset to the transfer edge of the transfer pulse. These output phases (i.e. timing differences) can also be used to control a switched capacitor filter as a type of charge-based integration capacitor reset that does not stop integration.

In some embodiments, the temporary feedback is obtained by discharging a capacitor specifically included to provide the required pulse delay. In other embodiments, the delay is obtained by including a slew-limited stage delay in the comparator that utilizes the integrating capacitance on the outputs.

The present application discloses, in a first general aspect, a readout integrated circuit (ROIC) that includes an integration capacitor in electrical communication with a pixel and configured to accumulate an integration charge as current is drawn from the pixel, an integration comparator configured to compare the integration charge with an integration reference voltage applied to a reference input thereof, and to issue an integration reset pulse and an integration spike pulse whenever the integration charge is approximately equal to the integration reference voltage, an integration reset configured to reset the integration charge to an integration baseline value when the integration reset is triggered by the integration reset pulse, so that the integration comparator is caused to issue a train of integration reset pulses and integration spike pulses as the current is drawn from the pixel, a multi-value digital counter (MVDC) comprising a first stage, said first stage comprising a first charge accumulating capacitor that is configured to maintain a first stage MVDC charge, said first stage MVDC charge being incremented by said integration spike pulses so as to take on a series of discrete and distinguishable first stage charge values indicating a first stage count value that is a number of times that the first charge accumulating capacitor has been incremented by the integration spike pulses, and a multiplexer output that is accessible to a multiplexer so as to enable the multiplexer to read out the first stage charge value.

In embodiments, the integration reset pulse is also the integration spike pulse.

In any of the preceding embodiments, the integration reset pulse and the integration spike pulse can be separate output pulses of the integration comparator.

In any of the preceding embodiments, the integration comparator can include temporary positive feedback applied to the integration reset pulses.

In any of the preceding embodiments, the integration reset can includes a switched capacitor filter applied to the integration reset pulses.

In any of the preceding embodiments, the integration comparator can include a slew-limited stage delay of the integration reset pulses.

In any of the preceding embodiments, the MVDC first stage can further include a first stage comparator configured to compare the first stage charge value with a first maximum count value applied to a reference input thereof, and to issue a first stage reset pulse and a first stage output spike whenever the first stage charge value is equal to the maximum count value, and a first stage reset configured to reset the first stage charge value to a first stage baseline value when the first stage reset is triggered by the first stage reset pulse, and the MVDC can further include a second stage, where second stage includes a second charge accumulating capacitor that is configured to maintain a second stage MVDC charge, said second stage MVDC charge being incremented by said first stage output spikes so as to take on a series of discrete and distinguishable second stage charge values that indicate a second stage count value that is a number of times that the second charge accumulating capacitor has been incremented by the first stage output spikes, and a multiplexer output that is accessible to the multiplexer so as to enable the multiplexer to read out the second stage charge value.

In some of these embodiments, the first maximum count value is a voltage selected to cause the first stage reset to be triggered when the first stage charge value has been incremented N times, where N is a power of two. And in some of these embodiments the ROIC includes an analog-to-digital converter (ADC) that converts the first stage count value to a binary representation of the first stage count value.

In any of these embodiments, the multiplexer can be configured to read out the first stage charge value by applying a ramped voltage to the reference input of the first stage comparator or to a reference voltage of the first charge accumulating capacitor, said first stage charge value being determined according to voltage and timing characteristics of the applied voltage ramp and a measured time at which at least one of the first stage reset pulse and the first stage output spike is detected by the multiplexer.

In any of these embodiments, the first stage reset pulse can also be the first stage output spike, or the first stage reset pulse and the first stage output spike can be separate output pulses of the first stage comparator.

In any of these embodiments, the first stage comparator can include temporary positive feedback applied to the first stage reset pulses.

In any of these embodiments, the first stage reset can include a switched capacitor filter applied to the first stage reset pulses.

In any of these embodiments, the first stage comparator can include a slew-limited stage delay of the first stage reset pulses.

And in any of these embodiments, the first stage reset pulses and the first stage output spikes can be fixed in amplitude.

In any of the above embodiments, the multiplexer can be configured to read out a residual value of the integration charge by applying a ramped voltage to the reference input of the integration comparator, said residual value of the integration charge being determined according to voltage and timing characteristics of the voltage ramp applied to the integration comparator reference input and a measured time at which at least one of the integration reset pulse and the integration spike pulse is detected by the multiplexer.

In any of the above embodiments, the ROIC can be able to operate at cryogenic temperatures.

In any of the above embodiments, at least one in-pixel active electronic component included in the ROIC can be a field effect transistor.

The present application discloses, in a second general aspect, a method of reading out signal charges accumulated by a plurality of pixels. The method includes accumulating an integration charge in an integration capacitor that is in electrical communication with one of the pixels, comparing the integration charge with an integration reference voltage, issuing an integration spike pulse and resetting the integration charge to an integration baseline value whenever the integration charge is approximately equal to the integration reference voltage, so that a train of integration spike pulses is issued, incrementing a first stage multi-value digital counter (MVDC) charge of a first charge accumulating capacitor by said integration spike pulses so as to cause the first charge accumulating capacitor to take on a series of discrete and distinguishable first stage charge values indicating a first stage count value that is a number of times that the first charge accumulating capacitor has been incremented by the integration spike pulses, and reading out the first stage charge value.

Implementations of the techniques discussed above may include a method or process, a system or apparatus, a kit, or computer software stored on a computer-accessible medium. The details or one or more implementations are set forth in the accompanying drawings and the description below. Other features will be apparent from the description and drawings, and form the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be better understood by reading the following detailed description, taken together with the figures herein described. The accompanying drawings are not intended to be drawn to scale. For purposes of clarity, not every component may be labeled in every drawing.

DETAILED DESCRIPTION

Figure 1:
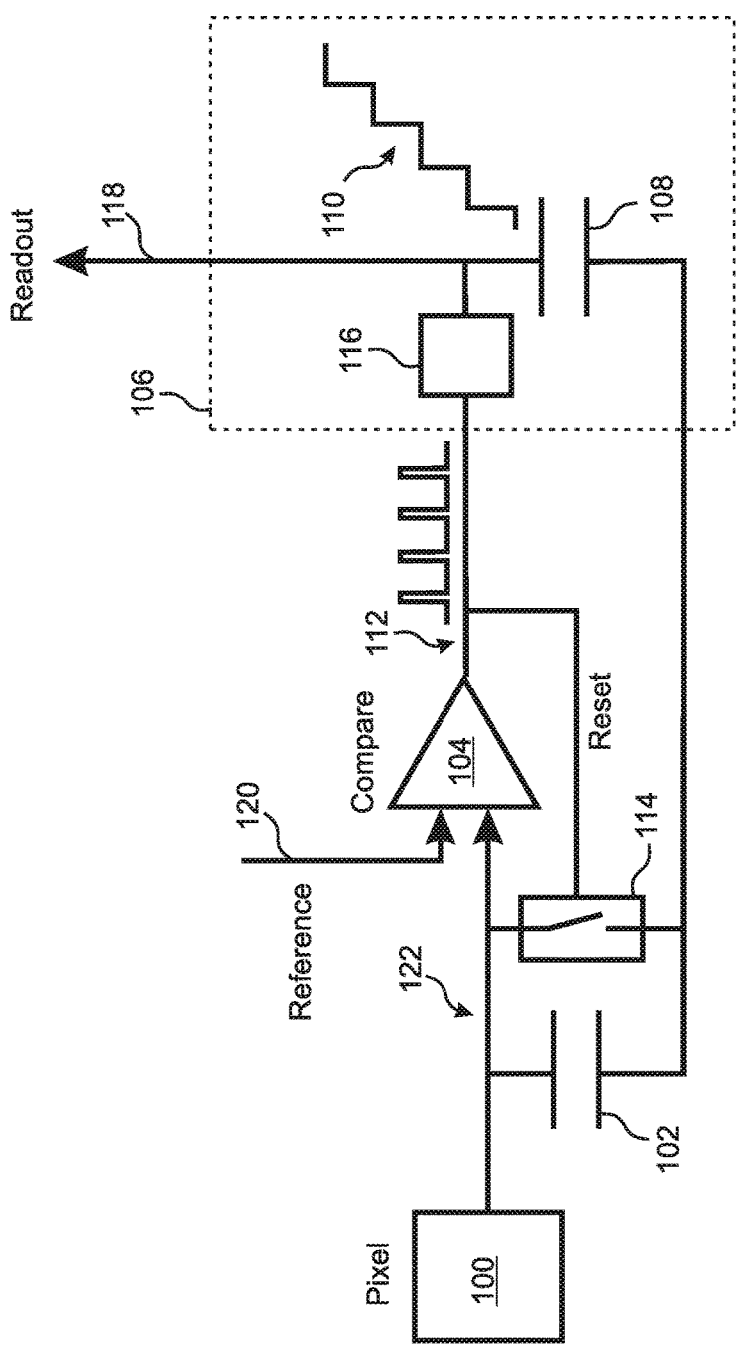
FIG. 1 is a simplified electronic diagram of an embodiment of the invention that includes a single-stage MVDC.

The present application discloses an ROIC that provides in-pixel digitization of signal charges without requiring conventional in-pixel ADC's or digital counters, thereby providing the advantages of in-pixel digitization, including high signal-to-noise and improved dynamic range performance, while also providing high pixel density. With reference to FIG. 1, for each pixel 100 in the FPA, the disclosed ROIC implements an in-pixel integration capacitor 102 and a comparator 104. Instead of a binary counter, however, the disclosed ROIC implements digital counters 106 that are not binary, but instead implement digital logic having a base that is higher than base two. These non-binary, "multi-value" digital counters ("MVDC's") 106 require only a few components, and are therefore highly compact and enable very high pixel densities in the FPA.

Specifically, the disclosed multi-value digital counters 106 store digital information by accumulating charge in a charge-accumulating capacitor 108, whereby the capacitor charge is allowed to take on only certain well-defined values 110. Hence, the charge state of the charge-accumulating capacitor 108 represents a digitally stored value that is not binary, i.e. not "base-2," but instead has a digital base that is equal to the maximum number of charge states that are allowed by the MVDC.

More specifically, each pixel 100 of the disclosed ROIC includes a integration capacitor 102 and a reset comparator 104 that translate the signal charge of the pixel 100 into a train of output current spikes 112, where the number of spikes 112 in the train reflects the total signal charge of the pixel 100. A reference voltage 120 is provided to the comparator 104, such that each time the integration capacitor 102 reaches a charge that is equal to the reference charge 120, an electronic switch 114 is activated so as to reset the integration capacitor 102, and a spike 112 is directed to a charge pump 116, which is triggered to apply a discrete and well defined charge pulse to the charge-accumulating capacitor 108 included in the multi-value digital counter 106. Because the input to the charge-accumulating capacitor 108 is in the form of a series of discrete, identical charge pulses, the charge level 110 of the charge-accumulating capacitor 108 is increased in a step-wise manner 110, such that it can take on only discrete, well-characterized charge values. Subsequently, during readout, the charge value 110 of the charge accumulating capacitor 108 is read out by the multiplexer of the ROIC, and is converted by an ADC into a conventional, binary representation.

It is notable that the pixel density of the disclosed ROIC is enhanced both due to the simplicity of the MVDC circuit, and also by the fact that only a single output line 118 is needed for reading out each of the MVDC's.

Figure 2:
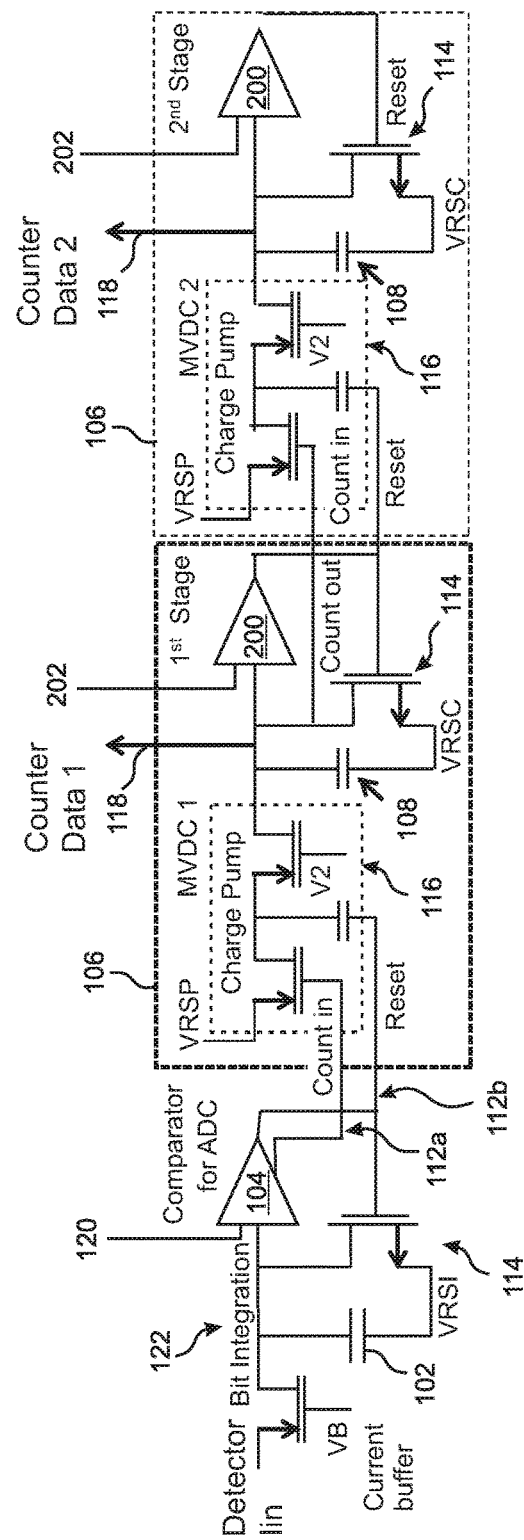
FIG. 2 is a simplified electronic diagram of an embodiment of the invention that includes a plurality of MVDC stages.

With reference to FIG. 2, in embodiments each pixel 100 of the disclosed ROIC includes a plurality of cascaded MVDC stages 106, whereby each MVDC stage 106 (except the last MVDC stage in the cascade, in some embodiments) includes an MVDC comparator 200 that resets the charge-accumulating capacitor 108 of the MVDC stage when it reaches a maximum charge value that is determined by an MVDC reference voltage 202 provided to the MVDC comparator 200. Upon resetting the charge accumulating capacitor 108, the MVDC comparator 200 also sends a voltage spike 112 to the charge pump 116 of the next MVDC stage 106 in the cascade. The maximum charge of the charge accumulating capacitor 108, and hence the numeric base of each MVDC stage 106, is thereby determined by the total charge conveyed to the charge accumulating capacitor 108 by each charge pulse, as determined by the charge pumps 116, and by the MVDC reference values 202 that are provided to the MVDC comparators 200. Cascading the MVDC stages 106 in this manner serves to increase the dynamic range of the MVDC, without increasing the number of charge values that each charge accumulating capacitor 108 is required to store and discriminate.

In various embodiments, each of the MVDC stages 106 has a numeric base that is a multiple of two. For example, MVDC stages 106 in embodiments can take on a maximum of 8 values or 16 values. This approach facilitates the conversion of the multi-value output voltages into conventional binary representations. For example, the output of charge accumulating capacitor 108 that can store a maximum of 16 voltage levels can be directly converted to a conventional binary output by a suitably calibrated hexadecimal ADC.

In some embodiments, the accumulated voltages of the charge accumulating capacitors 108 of each of the MVDC stages are presented by the ROIC multiplexer to a conventional, multiplexed ADC for conversion to binary format.

Figure 3A:
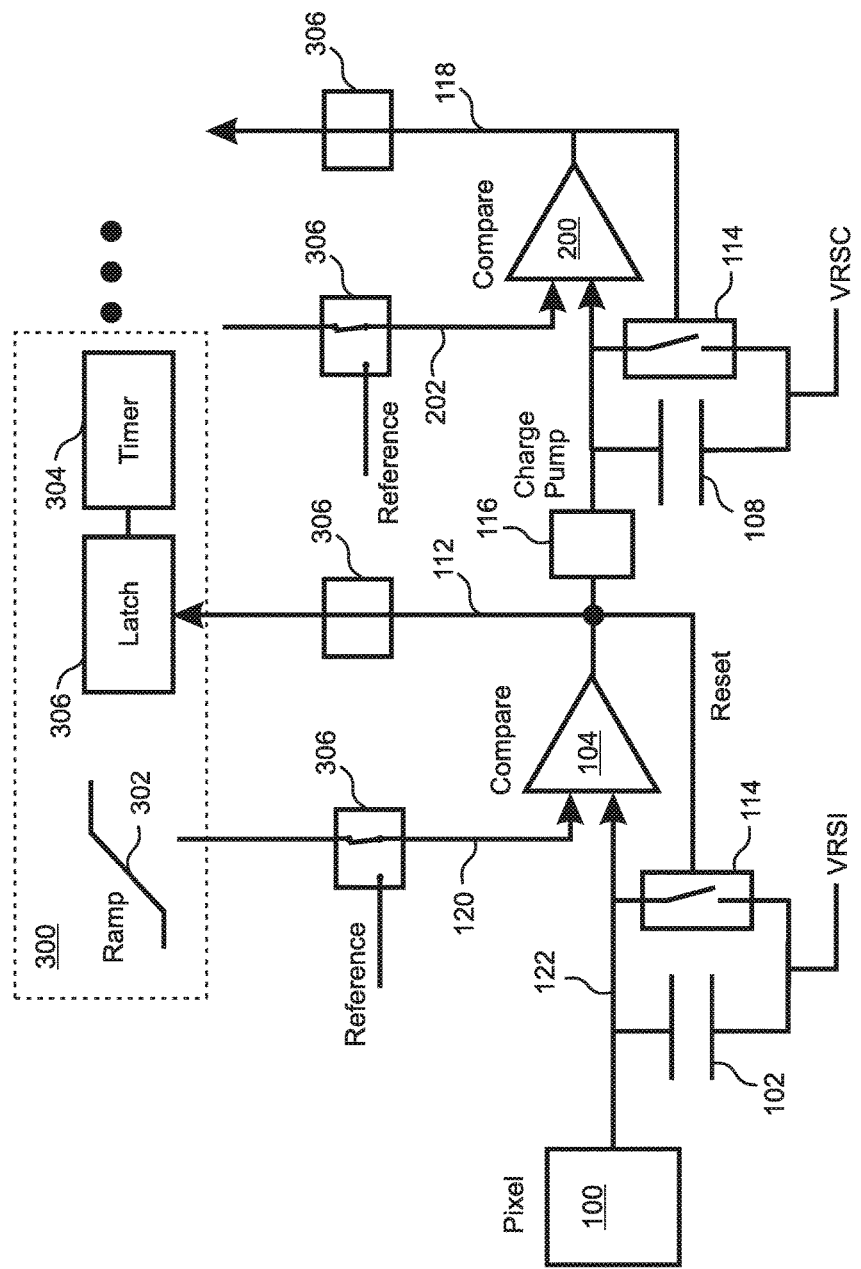
FIG. 3A is a simplified electronic diagram that illustrates readout of an MVDC using a single-slope ADC that is partly in-pixel, wherein a ramp voltage is applied to the reference inputs of the MVDC comparators.

With reference to FIG. 3A, in other embodiments the readout of each MVDC stage 106 is by means of a multiplexed pixel comparator (MPC) single-slope ADC 300, whereby the in-pixel comparators 104, 200 are used as the comparator of the single-slope ADC, while the ramp 302 and timer 304 of the single-slope ADC 300 are external and multiplexed. Specifically, according to this approach, the reference inputs 202 (which can be the same input or separate inputs) and charge pump outputs 118 of the MVDC stages 106 are made accessible to the single-slope ADC's 300 by the multiplexer. The stored charge value of each charge accumulating capacitor 108 of each of the MVDC stages 106 is read out by applying a ramped voltage 302 to the reference inputs 120, 202 and measuring the time interval 304 between initiating of the ramp 302 and receiving the reset pulse from the comparator 200. For example, the reset pulse from each MVDC comparator 200 can trigger a latch 308 to store the timer output. In some of these embodiments, the time interval is measured by a time base and grey code digital counter 304.

Figure 3B:
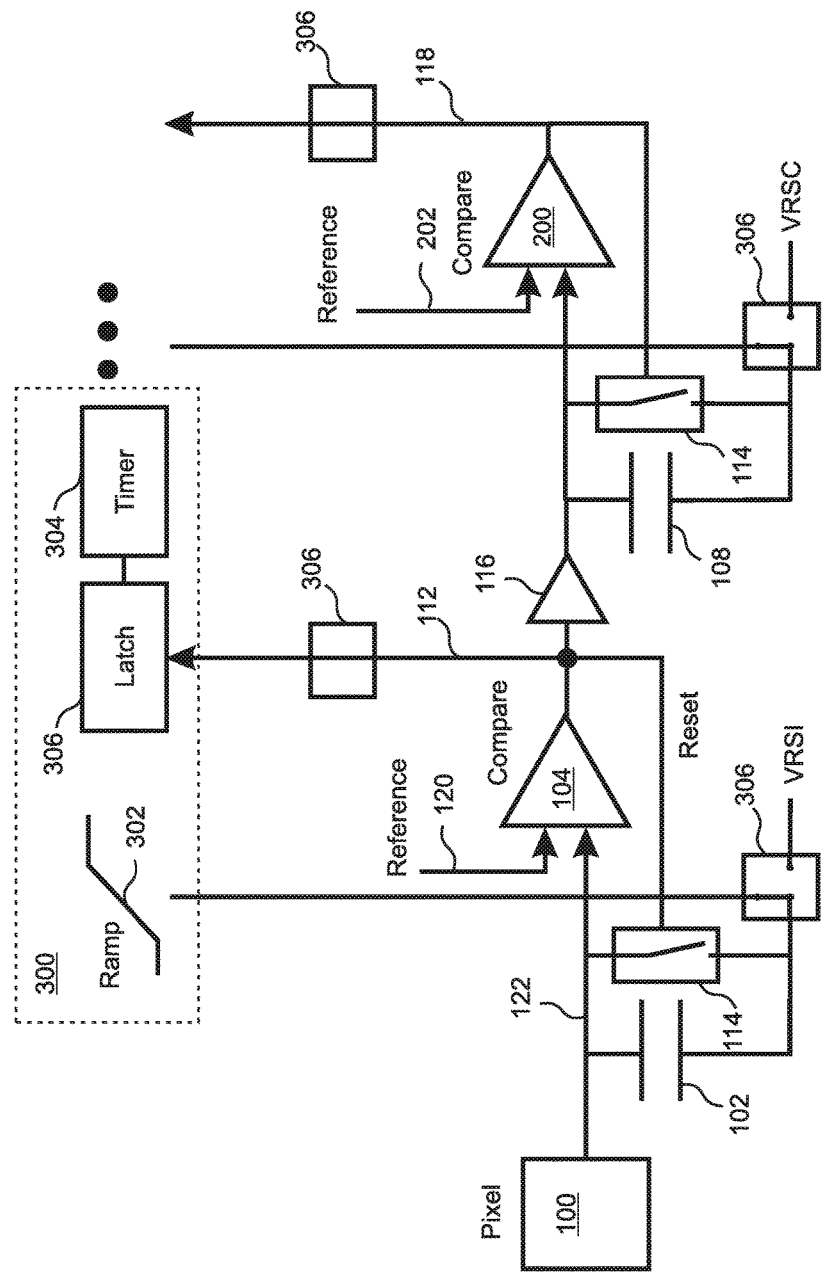
FIG. 3B is a simplified electronic diagram that illustrates readout of an MVDC using a single-slope ADC that is partly in-pixel, wherein a ramp voltage is applied to the capacitor references VRSI, VRSC of the MVDC comparators.

With reference to FIG. 3B, in similar embodiments the ramp voltage is applied to the reference voltages (VRSC) of the integrating 102 and charge accumulating 108 capacitors. In the embodiment of FIGS. 3A and 3B, the MPC single slope ADC 300 is also used to measure the residual charge of the integration capacitor 102, whereby the charge pump comparator 104 and the charge pump reset pulse 112 form the in-pixel portion of the single slope ADC.

Figure 3C:
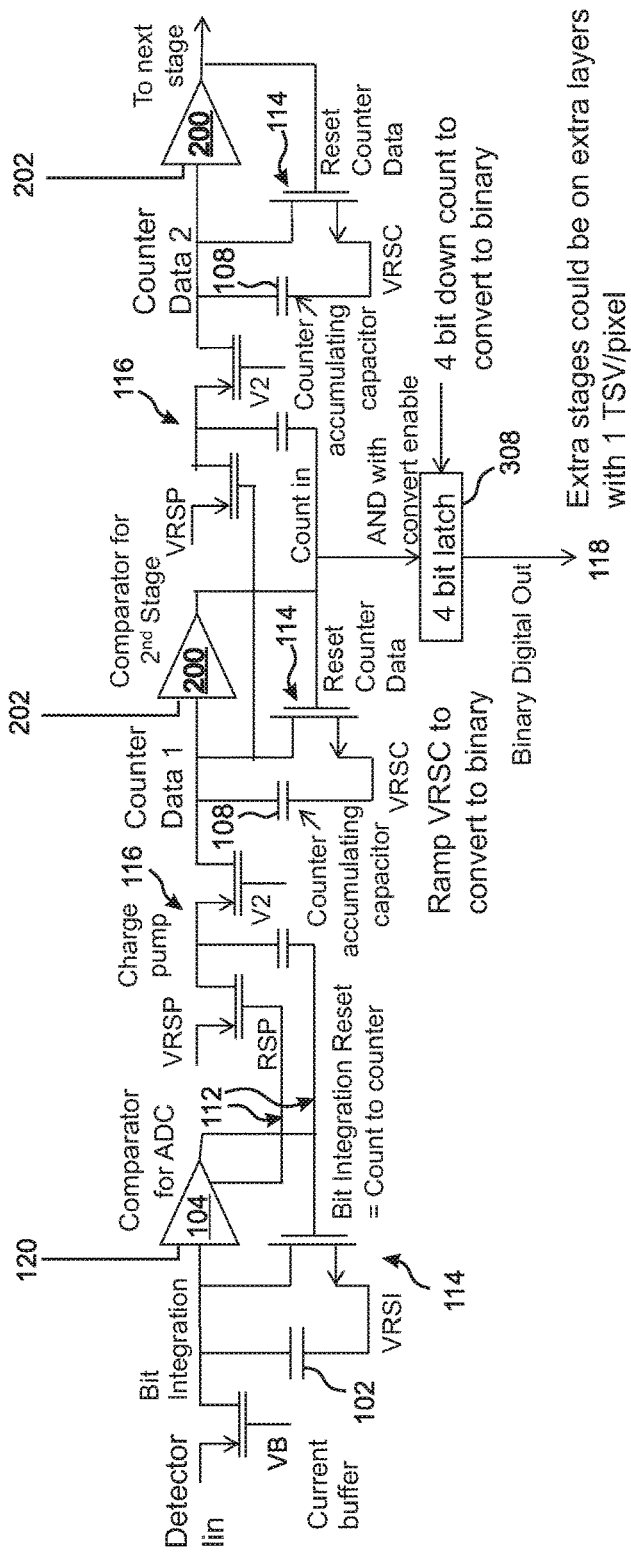
FIG. 3C is an electronic diagram of an embodiment that includes an in-pixel counter and latch that converts the count value of the MVDC stage to a binary output.

FIG. 3C illustrates an embodiment in which the output of each stage 106 of the MVDC is converted to binary form in the pixel, before MPC readout. According to this embodiment, a 4-bit latch 308 is used as part of the single slope conversion of the data stored by the charge accumulating capacitor 108. The ramp voltage is applied to the accumulating capacitor reference VRSC with a 4 bit count synchronously applied to the inputs of the latch 308. The VRSC ramp shifts the reference voltage of the charge accumulating capacitor 108 upward at the input of the comparator 200. When the input voltage gets high enough to trip the comparator 200, the count is stored by the latch 308. Since the time required to elevate the comparator input voltage to its maximum is the inverse of the amount of charge stored by the charge accumulating capacitor 108, a down count is used in some embodiments so that the polarity of the digital signal is correct. In other embodiments, the stored charge value is computed after the data from the latch 204 is read off the device. Once the data is latched, a drive buffer and row select are used to read the digital data out from the latch.

The MPC single-slope ADC approach is preferable in some embodiments because it minimizes the ranges of the voltage fluctuations that must be transmitted across the multiplexer 306 by the ROIC, and thereby minimizes power consumption and increases readout speed. For example, embodiments that use a conventional ADC to read out the MVDC charge levels require transmission over the readout line of a voltage that can range up to the maximum charge level of the charge-accumulating capacitor 108 in each stage of the MVDC 106.

In contrast, embodiments that implement the MPC single slope ADC readout approach are only required to transmit the reset pulse of the MVDC comparator 200, which is typically much lower in voltage than the maximum charge state of the MVDC charge-accumulating capacitor 108. Since there is always a finite capacitance associated with the readout line 118, these lower voltages translate into faster timing as well as lower power consumption. Accordingly, embodiments that implement the MPC single slope ADC readout approach can significantly reduce power consumption and increase the pixel readout speed as compared to embodiments that use conventional ADC's.

The ability of the disclosed MVDC to store digital information requires that the charge pulses provided as inputs to the MVDC charge accumulating capacitors 108 by the charge pumps 116 be consistent in size and duration. However, the comparator output spikes 112, 118 also function to reset the integration capacitor 102 or the charge accumulating capacitor 108 in the previous stage 106 of the MVDC that provides input to the comparator 104, 200. As a result, the spikes 112, 118 essentially reset themselves, which could pose a danger that they might limit their own durations, and might cause inconsistent outputs from the charge pumps 116.

Figure 4A:
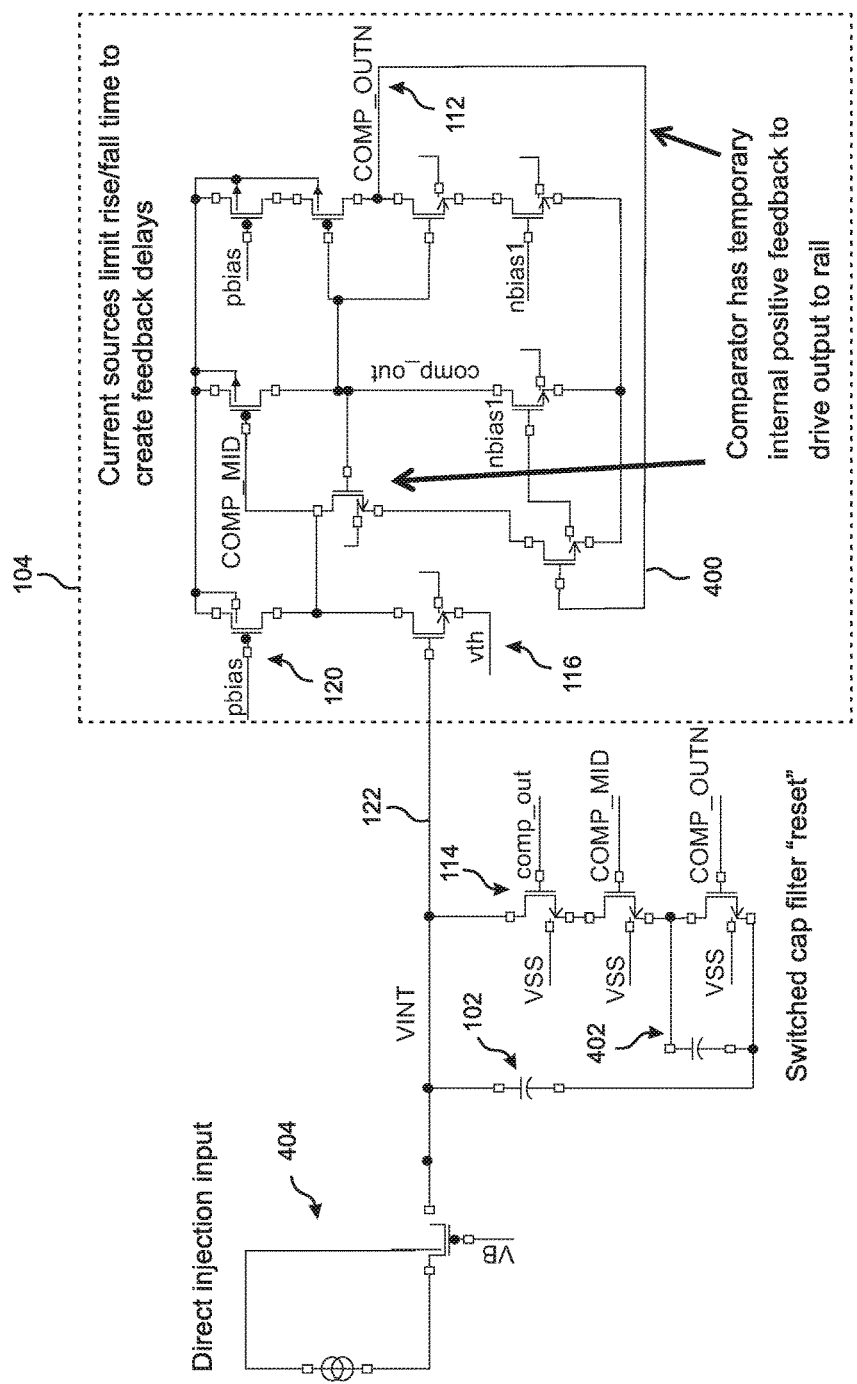
FIG. 4A is an electronic diagram of an integration capacitor, reset, and comparator circuit useful for simulating an embodiment that includes temporary positive feedback and a switched capacitor filter reset to ensure full-swing of the output pulse train.
Figure 4B:
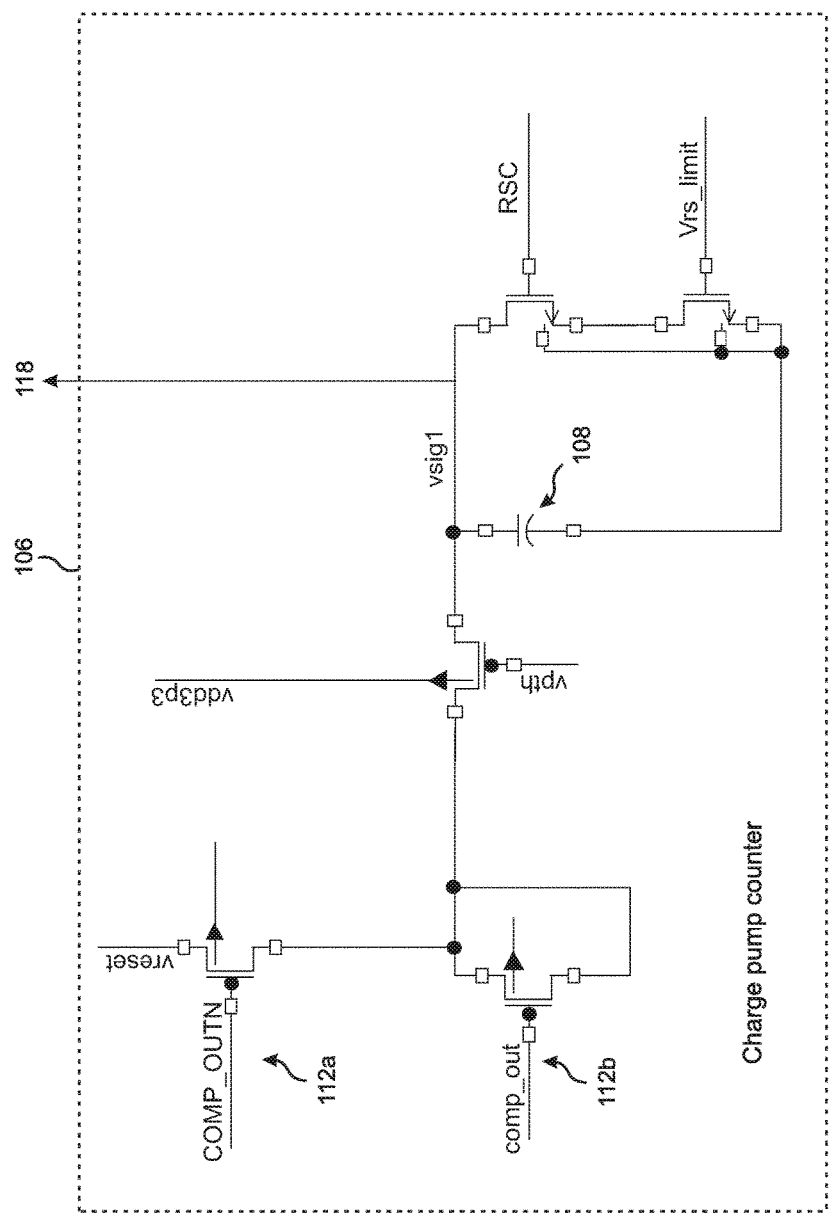
FIG. 4B is an electronic diagram of the MVDC of the simulation circuit of FIG. 4A, including the charge pump, accumulating capacitor, and reset.

With reference to FIG. 4A and FIG. 4B, in embodiments the comparators 104, 200) include temporary internal positive feedback 400 that guarantees that the outputs 112, 118 will be driven to their maximum levels. The embodiment of FIG. 4A includes a slew-limited stage delay in the comparator.

It is also notable that, in the embodiment of FIGS. 4A and 4B, the comparator 104 has three outputs 112a, 112b, and COMP MID, all three of which control the switched capacitor filter reset 114 and two of which (112a, 112b) provide input to the integration capacitor 108 of the MVDC.

Figure 5A:
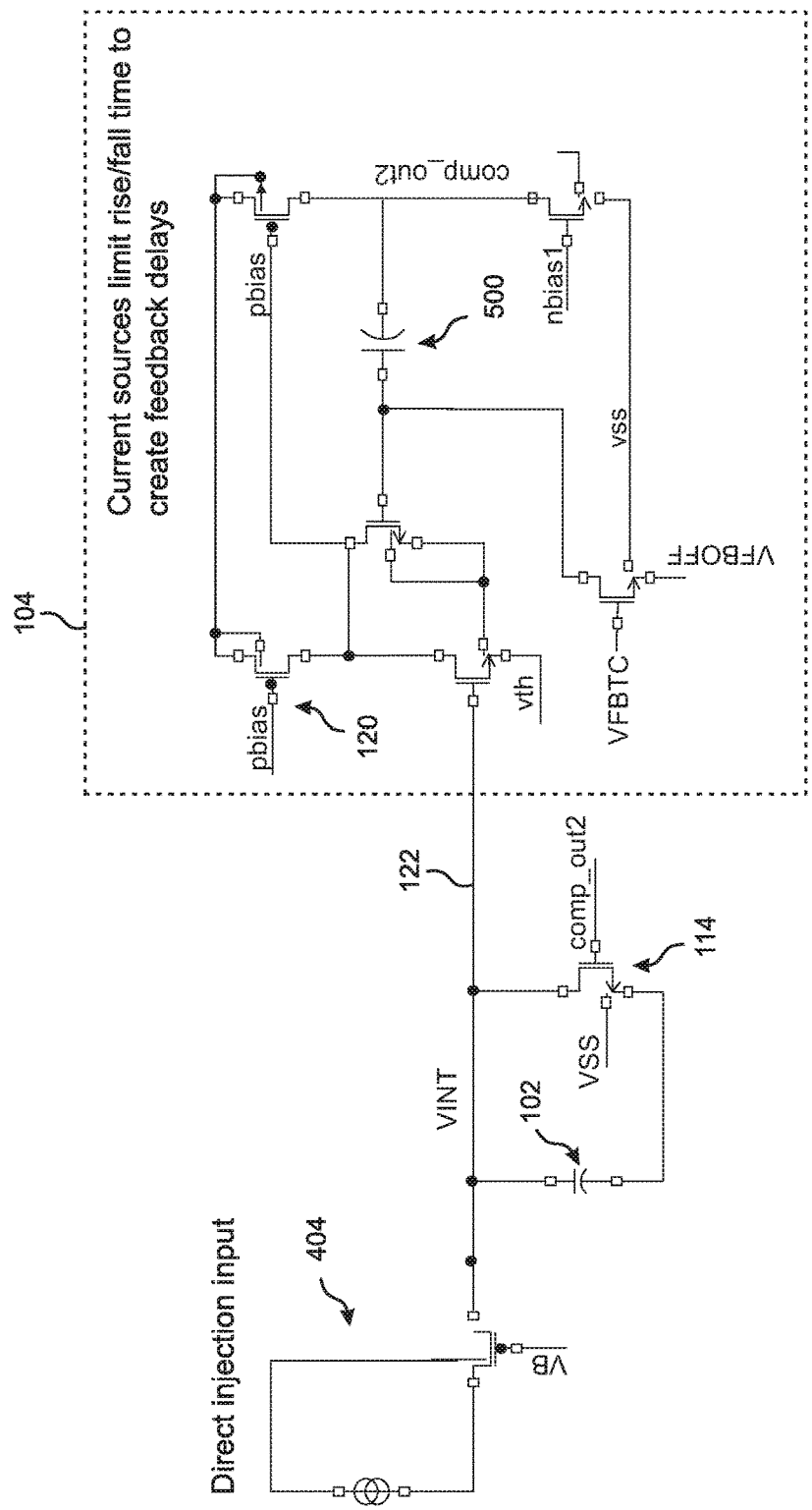
FIG. 5A is an electronic diagram of an integration capacitor, reset, and comparator circuit useful for simulating an embodiment where temporary internal positive feedback is obtained by discharging a capacitor specifically included to provide a required delay.
Figure 5B:
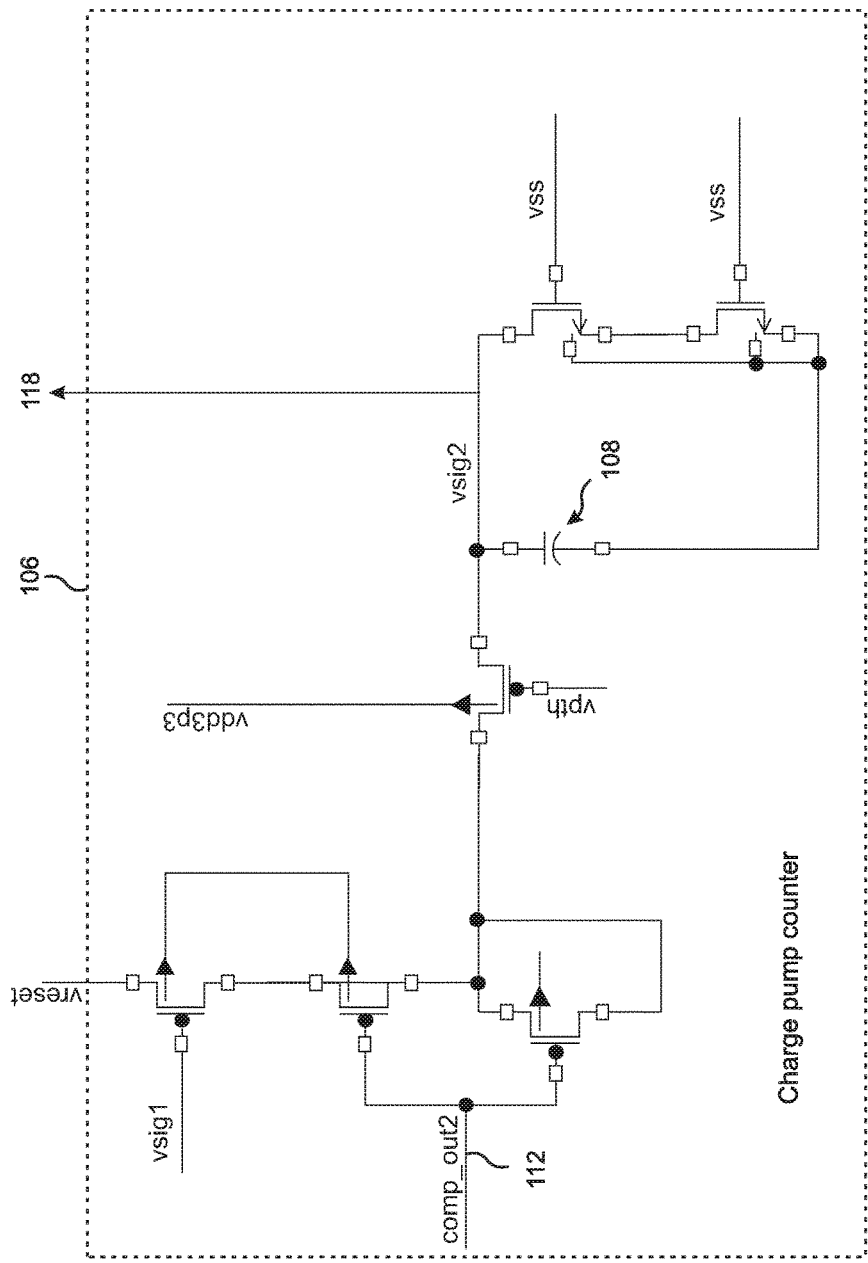
FIG. 5B is an electronic diagram of the MVDC of the simulation circuit of FIG. 5A, including the charge pump, accumulating capacitor, and reset.

With reference to FIGS. 5A and 5B, other embodiments include an AC-coupled positive feedback, such that the temporary feedback is obtained by discharging a capacitor 500 specifically included to provide the required pulse delay.

The circuits of FIGS. 4A-5B, are test circuits that can be used to simulate ROIC configurations of the present disclosure. As such, they include direct injection inputs 404, which are also used in some embodiments of the invention.

Figure 6A:
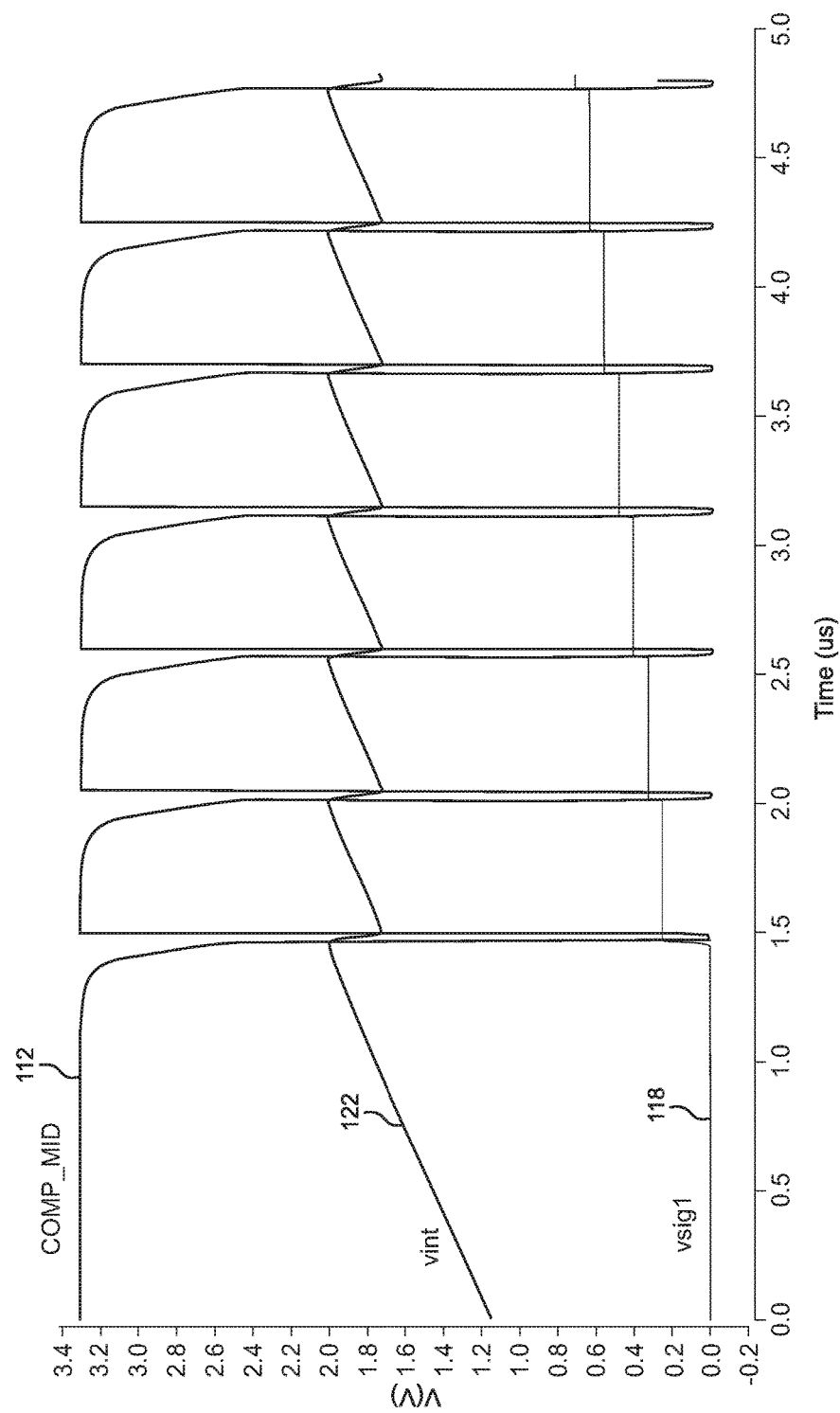
FIG. 6A is a timing diagram illustrating the charging of the integration capacitor, the timing of the reset pulse spikes, and the multi-value count storage of the charge accumulating capacitor in a simulation provided by the circuits of FIGS. 4A and 4B.
Figure 6B:
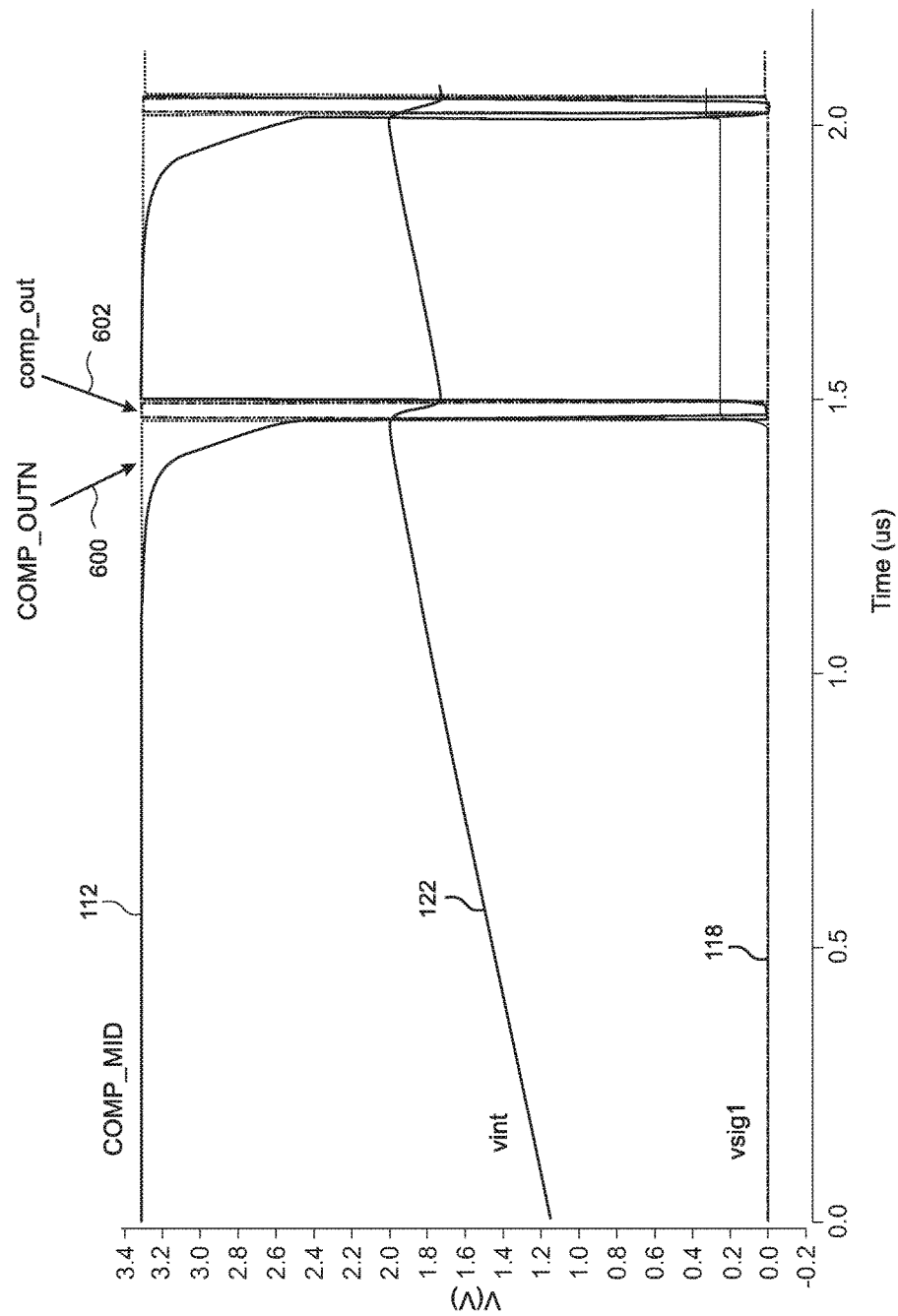
FIG. 6B is an expanded illustration of the timing diagram of FIG. 5A that includes additional timing curves illustrating the effect of temporary positive feedback in making the reset spikes square and consistent.
Figure 6C:
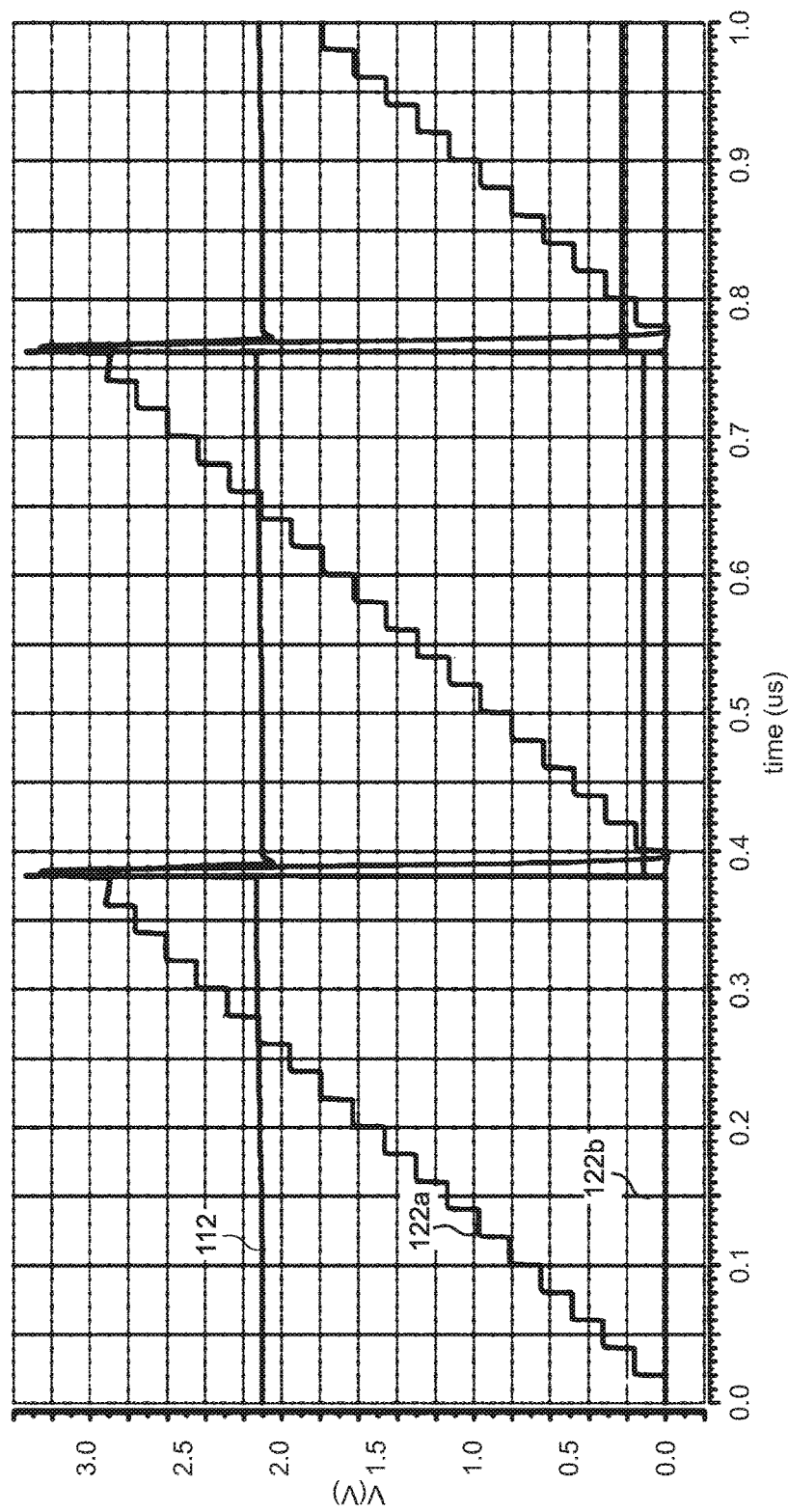
FIG. 6C is a timing diagram similar to FIG. 5A, showing multiple timing cycles for the first stage of a multi-stage MVDC in an embodiment where temporary internal positive feedback is obtained by discharging a capacitor specifically included to provide the required delay.

FIG. 6A presents typical simulation results obtained using the circuit of FIGS. 4A and 4B. It can be seen that the integration capacitor 102 is repeatedly charged and discharged, so that its output 122 describes a series of ramps in a "saw-tooth" pattern. The charge pump comparator 104 monitors this output, and issues a reset pulse 112 each time the integration capacitor charge 122 reaches a threshold value 120. As a result, the charge accumulating capacitor 108 assumes a series of discrete, well characterized values in a "stair-step" pattern 118. FIG. 6B is an enlargement of the first part of FIG. 6A, where additional signals have been added that illustrate the "squaring-off" of the comparator output spikes (shown in both negative 600 and positive 602 polarity) by the temporary positive internal feedback 400. FIG. 6C shows the simulation waveforms of an MVDC simulation with multiple MVDC stages or "bits," illustrating the outputs of the least significant bit 122a and the next most significant bit 122b. The outputs are shown over several counting cycles of the least significant bit 122a.

It should be noted that in embodiments all of the active components of the disclosed ROIC are field effect transistors (FET's), which allows the ROIC to operate at cryogenic temperatures.

Figure 7A:
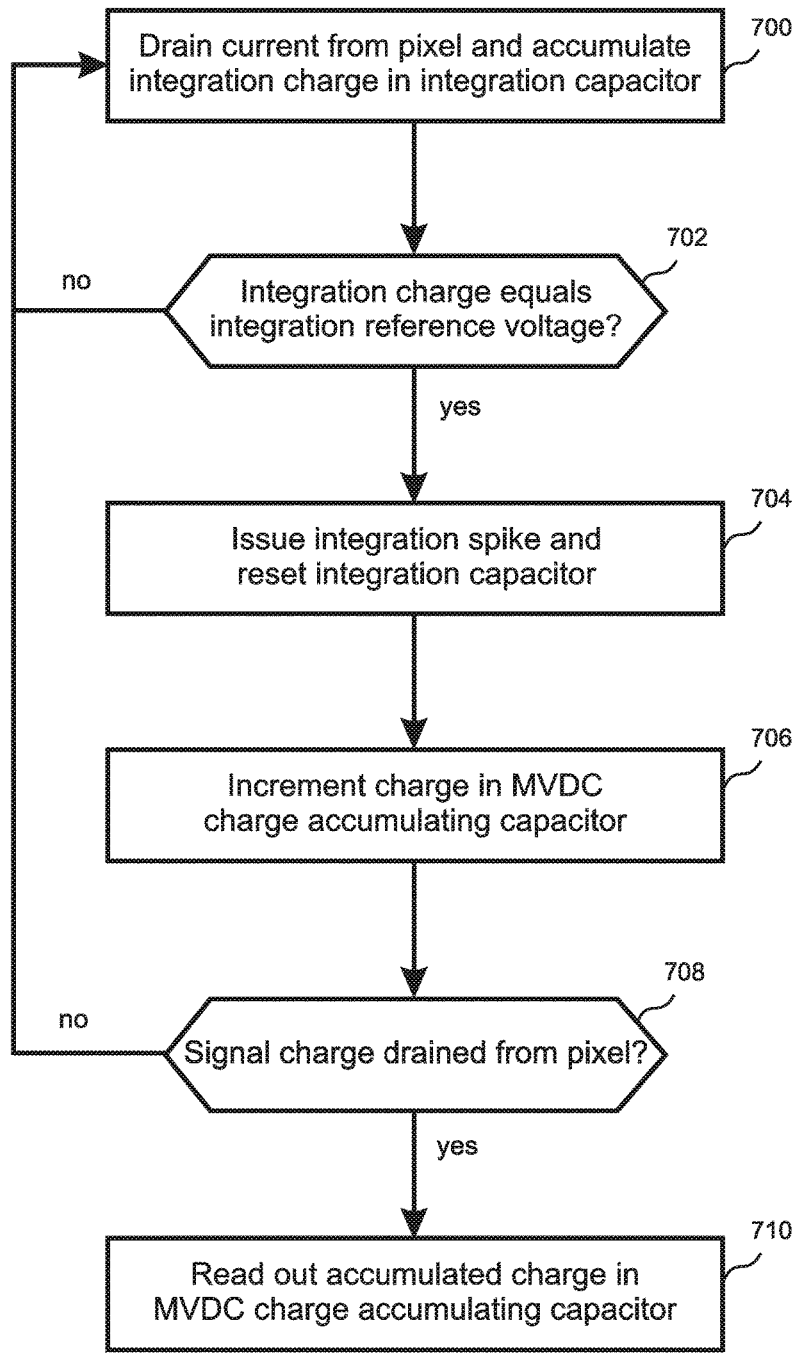
FIG. 7A is a flow diagram illustrating an embodiment of the method of the present invention that includes only a single MVDC stage.

FIG. 7A is a flow diagram that illustrates a method embodiment of the present invention for a single stage MVDC counter or for the first stage of a multi-stage MVDC counter that does not reach its full value. According to this embodiment, current is drawn from the pixel and used to accumulate charge in the integration capacitor 700. The accumulated charge in the integration capacitor is compared with an integration reference voltage 702, and when the two are equal the comparator issues an integration spike and resets the integration capacitor 704. At the same time, the charge pump directs a charge pulse of fixed and consistent amplitude to the MVDC charge accumulating capacitor, thereby increasing its accumulated charge by a fixed, pre-established amount 706. This continues until the signal charge on the pixel has been exhausted 708, at which point the accumulated charge in the MVDC charge accumulating capacitor is read out 710 and is used to determine the signal charge of the pixel.

Figure 7B:
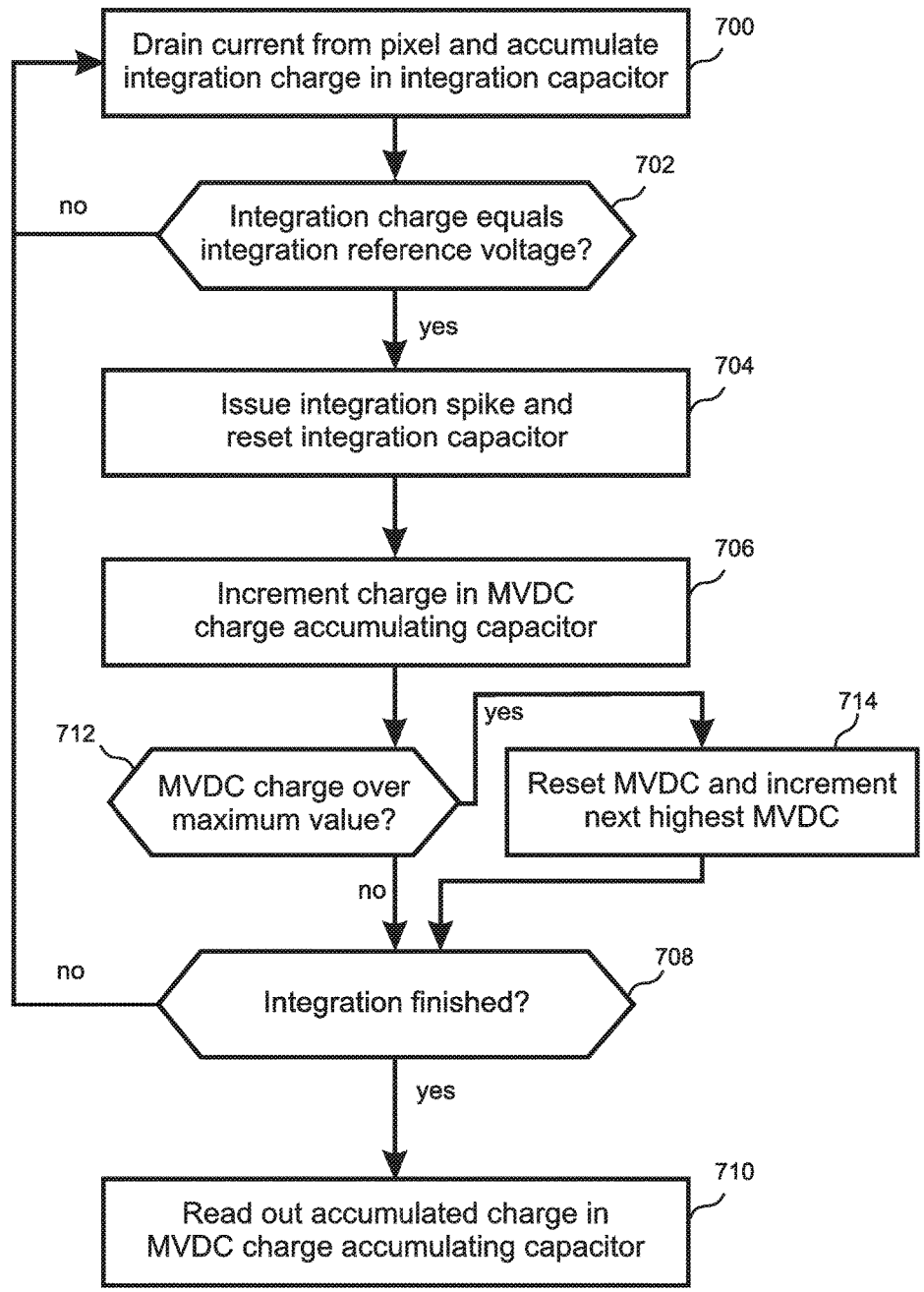
FIG. 7B is a flow diagram illustrating the operation of a single MVDC stage in an embodiment of the invention that includes a multi-stage MVDC.

FIG. 7B is a flow diagram that illustrates operation of a first stage in a multi-stage embodiment of the present invention. According to this embodiment, the system tests the charge value of the MVDC charge accumulating capacitor 712 to determine if it has exceeded its maximum value. If the accumulated charge is found to have exceeded its maximum value, the charge accumulating capacitor, and hence the MVDC stage, is reset, and the next highest MVDC stage is incremented 714.

The foregoing description of the embodiments of the invention has been presented for the purposes of illustration and description. Although operations are depicted in the drawings in a particular order, this should not be understood as requiring that such operations be performed in the particular order shown or in sequential order, or that all illustrated operations be performed, to achieve desirable results. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

What is claimed is:

1. A readout integrated circuit (ROIC) comprising:
an integration capacitor in electrical communication with a pixel and configured to accumulate an integration charge as current is drawn from the pixel;
an integration comparator configured to compare the integration charge with an integration reference voltage applied to a reference input thereof, and to issue an integration reset pulse and an integration spike pulse whenever the integration charge is approximately equal to the integration reference voltage;
an integration reset configured to reset the integration charge to an integration baseline value when the integration reset is triggered by the integration reset pulse, so that the integration comparator is caused to issue a train of integration reset pulses and integration spike pulses as the current is drawn from the pixel;
a multi-value digital counter (MVDC) comprising a first stage, said first stage comprising a first charge accumulating capacitor that is configured to maintain a first stage MVDC charge, said first stage MVDC charge being incremented by said integration spike pulses so as to take on a series of discrete and distinguishable first stage charge values indicating a first stage count value that is a number of times that the first charge accumulating capacitor has been incremented by the integration spike pulses; and
a multiplexer output that is accessible to a multiplexer so as to enable the multiplexer to read out the first stage charge value.

2. The ROIC of claim 1, wherein the integration reset pulse is also the integration spike pulse.

3. The ROIC of claim 1, wherein the integration reset pulse and the integration spike pulse are separate output pulses of the integration comparator.

4. The ROIC of claim 1, wherein the integration comparator includes temporary positive feedback applied to the integration reset pulses.

5. The ROIC of claim 1, wherein the integration reset includes a switched capacitor filter applied to the integration reset pulses.

6. The ROIC of claim 1, wherein the integration comparator includes a slew-limited stage delay of the integration reset pulses.

7. The ROIC of claim 1, wherein the MVDC first stage further comprises:
a first stage comparator configured to compare the first stage charge value with a first maximum count value applied to a reference input thereof, and to issue a first stage reset pulse and a first stage output spike whenever the first stage charge value is equal to the maximum count value; and
a first stage reset configured to reset the first stage charge value to a first stage baseline value when the first stage reset is triggered by the first stage reset pulse;
and wherein the MVDC further comprises a second stage, said second stage comprising:
a second charge accumulating capacitor that is configured to maintain a second stage MVDC charge, said second stage MVDC charge being incremented by said first stage output spikes so as to take on a series of discrete and distinguishable second stage charge values that indicate a second stage count value that is a number of times that the second charge accumulating capacitor has been incremented by the first stage output spikes; and
a multiplexer output that is accessible to the multiplexer so as to enable the multiplexer to read out the second stage charge value.

8. The ROIC of claim 7, wherein the first maximum count value is a voltage selected to cause the first stage reset to be triggered when the first stage charge value has been incremented N times, where N is a power of two.

9. The ROIC of claim 8, wherein the ROIC includes an analog-to-digital converter (ADC) that converts the first stage charge value to a binary representation of the first stage count value.

10. The ROIC of claim 7, wherein the multiplexer is configured to read out the first stage charge value by applying a ramped voltage to the reference input of the first stage comparator or to a reference voltage of the first charge accumulating capacitor, said first stage charge value being determined according to voltage and timing characteristics of the applied voltage ramp and a measured time at which at least one of the first stage reset pulse and the first stage output spike is detected by the multiplexer.

11. The ROIC of claim 7, wherein the first stage reset pulse is also the first stage output spike.

12. The ROIC of claim 7, wherein the first stage reset pulse and the first stage output spike are separate output pulses of the first stage comparator.

13. The ROIC of claim 7, wherein the first stage comparator includes temporary positive feedback applied to the first stage reset pulses.

14. The ROIC of claim 7, wherein the first stage reset includes a switched capacitor filter applied to the first stage reset pulses.

15. The ROIC of claim 7, wherein the first stage comparator includes a slew-limited stage delay of the first stage reset pulses.

16. The ROIC of claim 7, wherein the first stage reset pulses and the first stage output spikes are fixed in amplitude.

17. The ROIC of claim 1, wherein the multiplexer is configured to read out a residual value of the integration charge by applying a ramped voltage to the reference input of the integration comparator, said residual value of the integration charge being determined according to voltage and timing characteristics of the voltage ramp applied to the integration comparator reference input and a measured time at which at least one of the integration reset pulse and the integration spike pulse is detected by the multiplexer.

18. The ROIC of claim 1, wherein the ROIC is able to operate at cryogenic temperatures.

19. The ROIC of claim 1, wherein at least one in-pixel active electronic component included in the ROIC is a field effect transistor.

20. A method of reading out signal charges accumulated by a plurality of pixels, the method comprising:
  accumulating an integration charge in an integration capacitor that is in electrical communication with one of the pixels;
  comparing the integration charge with an integration reference voltage;
  issuing an integration spike pulse and resetting the integration charge to an integration baseline value whenever the integration charge is approximately equal to the integration reference voltage, so that a train of integration spike pulses is issued;
  incrementing a first stage multi-value digital counter (MVDC) charge of a first charge accumulating capacitor by said integration spike pulses so as to cause the first charge accumulating capacitor to take on a series of discrete and distinguishable first stage charge values indicating a first stage count value that is a number of times that the first charge accumulating capacitor has been incremented by the integration spike pulses; and
  reading out the first stage charge value.

* * * * *